(12) United States Patent
Barsukov

(10) Patent No.: US 9,785,923 B2
(45) Date of Patent: Oct. 10, 2017

(54) METHOD FOR PROCESSING FINANCIAL TRANSACTIONS BY A SECURE TERMINAL WITH A REMOTE HOST SYSTEM

(75) Inventor: Dmitry Barsukov, Edinburgh (GB)

(73) Assignee: INGENICO LIMITED, Fife (GB)

( * ) Notice: Subject to any disclaimer, the term of this patent is extended or adjusted under 35 U.S.C. 154(b) by 2574 days.

(21) Appl. No.: 11/658,773

(22) PCT Filed: Jul. 29, 2005

(86) PCT No.: PCT/GB2005/002994
§ 371 (c)(1),
(2), (4) Date: Dec. 12, 2008

(87) PCT Pub. No.: WO2006/010947
PCT Pub. Date: Feb. 2, 2006

(65) Prior Publication Data
US 2009/0204545 A1  Aug. 13, 2009

(30) Foreign Application Priority Data
Jul. 29, 2004 (GB) .................................. 0416857.1

(51) Int. Cl.
*G06F 21/00* (2013.01)
*G06Q 20/10* (2012.01)
*G06Q 20/20* (2012.01)
*G06Q 20/40* (2012.01)

(52) U.S. Cl.
CPC ............. *G06Q 20/10* (2013.01); *G06Q 20/20* (2013.01); *G06Q 20/204* (2013.01); *G06Q 20/401* (2013.01)

(58) Field of Classification Search
USPC .......... 705/73, 16, 21, 59; 380/44, 262, 278, 380/279
See application file for complete search history.

(56) References Cited

U.S. PATENT DOCUMENTS

| 5,474,756 | A | * | 12/1995 | Tweedle | ................. | A61K 49/06 |
| | | | | | | 424/9.363 |
| 5,475,756 | A | * | 12/1995 | Merritt | ........................... | 705/73 |
| 5,696,909 | A | * | 12/1997 | Wallner | ................. | G06Q 20/00 |
| | | | | | | 235/379 |
| 5,948,066 | A | * | 9/1999 | Whalen et al. | ................ | 709/229 |
| 6,477,526 | B2 | * | 11/2002 | Hayashi | ............. | G01C 21/3676 |
| | | | | | | 701/532 |
| 6,705,517 | B1 | * | 3/2004 | Zajkowski | .............. | G06F 3/023 |
| | | | | | | 235/379 |

(Continued)

FOREIGN PATENT DOCUMENTS

WO    WO 0106338 A    1/2001

OTHER PUBLICATIONS

"Client-Side Javascript Guide Version 1.3" [online] 1999, NETSCAPE, Mountain View CA 94043. Retrieved from the Internet: URL:http://devedge-temp.mozilla.org/library/manuals/2000/javascript/1.3/guide/ClientGuideJS13.pdf>[retrieved on Jan. 5, 2006] pp. 33-45, 147-156.

*Primary Examiner* — Dante Ravetti
(74) *Attorney, Agent, or Firm* — David D. Brush; Westman Champlin & Koehler, P.A.

(57) ABSTRACT

A new electronic financial transaction (EFT) system is proposed, wherein the business logic of a transaction is defined at a location remote from a secure point of sale terminal, thus having a framework wherein the business logic can be easily customized or updated.

18 Claims, 12 Drawing Sheets

(56) References Cited

U.S. PATENT DOCUMENTS

| | | | | |
|---|---|---|---|---|
| 7,984,172 B2* | 7/2011 | Wagner | ............ | G06F 8/33 |
| | | | | 709/201 |
| 2003/0041110 A1* | 2/2003 | Wenocur | ............ | G06Q 10/107 |
| | | | | 709/206 |
| 2003/0141360 A1* | 7/2003 | De Leo | ............ | G06Q 20/18 |
| | | | | 235/379 |
| 2003/0191698 A1* | 10/2003 | Brown | ............ | G06Q 10/087 |
| | | | | 705/28 |
| 2003/0217005 A1* | 11/2003 | Drummond | ............ | G06F 3/023 |
| | | | | 705/43 |
| 2004/0006536 A1* | 1/2004 | Kawashima | ............ | G06Q 20/04 |
| | | | | 705/39 |
| 2004/0107125 A1* | 6/2004 | Guheen et al. | ............ | 705/7 |
| 2004/0185931 A1* | 9/2004 | Lowell et al. | ............ | 463/17 |
| 2004/0186760 A1* | 9/2004 | Metzger | ............ | G06Q 10/087 |
| | | | | 705/28 |

\* cited by examiner

METHOD FOR PROCESSING FINANCIAL TRANSACTIONS BY A SECURE TERMINAL WITH A REMOTE HOST SYSTEM

The present invention relates to electronic financial transactions, in particular to electronic financial transaction systems and methods and components of such systems.

It is well known to use electronic financial transaction (EFT) systems to enable customers to effect payments for goods and services using a variety of types of debit and credit cards, hereinafter referred to as "transaction cards" or simply "cards", which terms will be understood to include equivalent types of data carrier or the like employed in EFT transactions, which may include for example an electronic voucher for pre-pay mobile transactions. In such systems an EFT point of sale (POS) terminal (EFTPOS terminal) communicates with a remote "acquirer" system, generally operated by or on behalf of a financial institution such as a bank, to authorise and process transactions.

Generally, the EFTPOS terminal acquires the customer's card details (usually by reading a magnetic strip or interrogating a chip on the card) and other information including at least the amount of the transaction (usually by keypad entry or directly from an associated cash register system or the like) then goes online via a telecommunications link to the acquirer system to authorise and/or process the transaction. There are many variations in the way that EFT transactions may be authorised and processed, including the use of "floor limits" to determine whether online authorisation is required, real-time versus batch mode transaction processing, trickle-feed transaction processing etc. The present invention is applicable to all such modes of EFT processing.

Conventional EFT systems and methods will not be described in detail herein, such details being well known to skilled persons, but the following should be noted.

EFT systems generally conform to standard protocols for authorising and processing transactions. In the United Kingdom, such protocols include APACS 30/50 and APACS 40. Similar and/or equivalent protocols apply elsewhere. The present invention will be described with particular reference to APACS protocols but it will be understood that the invention is not limited thereto and is intended to be useable, or adaptable for use, with all EFT protocols.

EFTPOS terminals generally include one or more card reader devices, or equivalents, a display, keypad and/or pinpad or equivalents, and a printer and may comprise standalone devices, POS systems with multiple wireless handsets, and devices associated or integrated with cash registers and other "local" devices and systems etc. as are well known in the art, and may communicate with acquirer systems directly or through one or more intermediary systems, as is also well known. It will be understood that the present invention is intended to be applicable to all such types of EFTPOS terminals and associated systems. In particular, where remote host systems or components of such systems, as described herein as part of the systems of the present invention, are described as communicating with acquirer systems, it will be understood that such communications may involve additional intermediary systems.

The present invention is also intended to be useable with all known and proposed types of customer identity verification, including signature and PIN verification and biometric verification technologies such as fingerprint, voice and retinal scan recognition.

It is implicit that an EFTPOS terminal is a "secure terminal", meaning a terminal that has one or more security mechanisms to prevent interception or interpretation of communications, to prevent the use of a fake terminal or fake acquirer host, or to prevent physical tampering with the terminal. The security mechanisms implemented need to be of sufficient rigour to give a proper level of security given the nature and size of the transactions that are being carried out. It is also implicit that all communications systems employed in EFT systems must be secure. Data processing systems forming part of EFT systems, other than end-user terminals and associated local systems, will generally be located in a controlled, secure environment, and can be assumed to be "secure".

In all types of conventional EFTPOS terminals as described above, the programming of the terminal whereby the terminal provides its user interface, reads transaction cards, prints transaction slips, determines how to process particular transactions and communicates with acquirers or other local or remote systems (some or all of which functions may be referred to as the "business logic" of the terminal) is written in a low level language, such as C or C++ and "hard-coded" in the terminal. That is, the programming is "permanently" resident in the terminal in hardware or firmware; i.e. it does not change during normal power cycling of the terminal or in normal use.

A major problem with conventional hard-coded terminals is that modifications, upgrades etc. of the terminal programming require (a) specialised programming skills and (b) on-site re-configuration of the installed terminal user-base. This means that the introduction of new or improved business logic or other terminal functions is complex, expensive and requires a long lead time. Also, such modifications and improvements must necessarily be developed and installed, in general, by the original equipment manufacturers or other highly specialised suppliers, rather than by users (in the sense of user organisations such as chain-stores, not individual end-users), service providers or acquirers. One result of this, apart from the high overheads involved in system development and maintenance, is that the infrastructure of EFT systems is very inflexible.

It is an object of the present invention to provide improved EFT systems, system components (including terminals) and methods that facilitate the maintenance and development of the system infrastructure, including the development and implementation of new and improved business logic.

Whilst certain features of the present invention can clearly be shown to be known from or to have counterparts in the various areas of general computing, networking and communications technologies, it is incorrect to assume that it is in any way obvious to employ or combine such features in the context of EFT systems, where security is paramount and users and service providers are naturally conservative. For example, mobile computing and communications devices may be known that employ a specially modified browser that allows a user access to specially-formatted internet content. However, due to the lack of any high security and tamper-detection hardware features, such as a High Security Core (HSC) or other EMV compliant features, there is no effective way that such a conventional mobile device could be considered for use as a secure terminal for electronic financial transactions.

The invention, in its various aspects and preferred features, is defined in the claims appended hereto. Further aspects and preferred features of the invention will be apparent from the following description of its preferred embodiments.

In the following description, a knowledge of conventional EFT systems, functions and terminology is assumed, as is a knowledge of generally accepted terminology relating to computing, computer networking and telecommunications. This includes terms that are defined in relevant standards and other documents produced by the IETF, WAP Forum, Unicode organisation, W3C, ISO, ETSI, ITU, and other organisations, both international and national.

Embodiments of the present invention will now be described, by way of example only, with reference to the accompanying drawings, in which.

The present invention provides a new universal approach for EFT (payment) systems, whereby business logic is completely removed from the terminal to a remote host system.

In the context of the present invention, a terminal is considered as a viewer of a web-like application located within the remote host system. The data entered by the user is processed in the same way for all applications. It is submitted to the remote host system and processed there in an application-specific manner.

Figure 1:
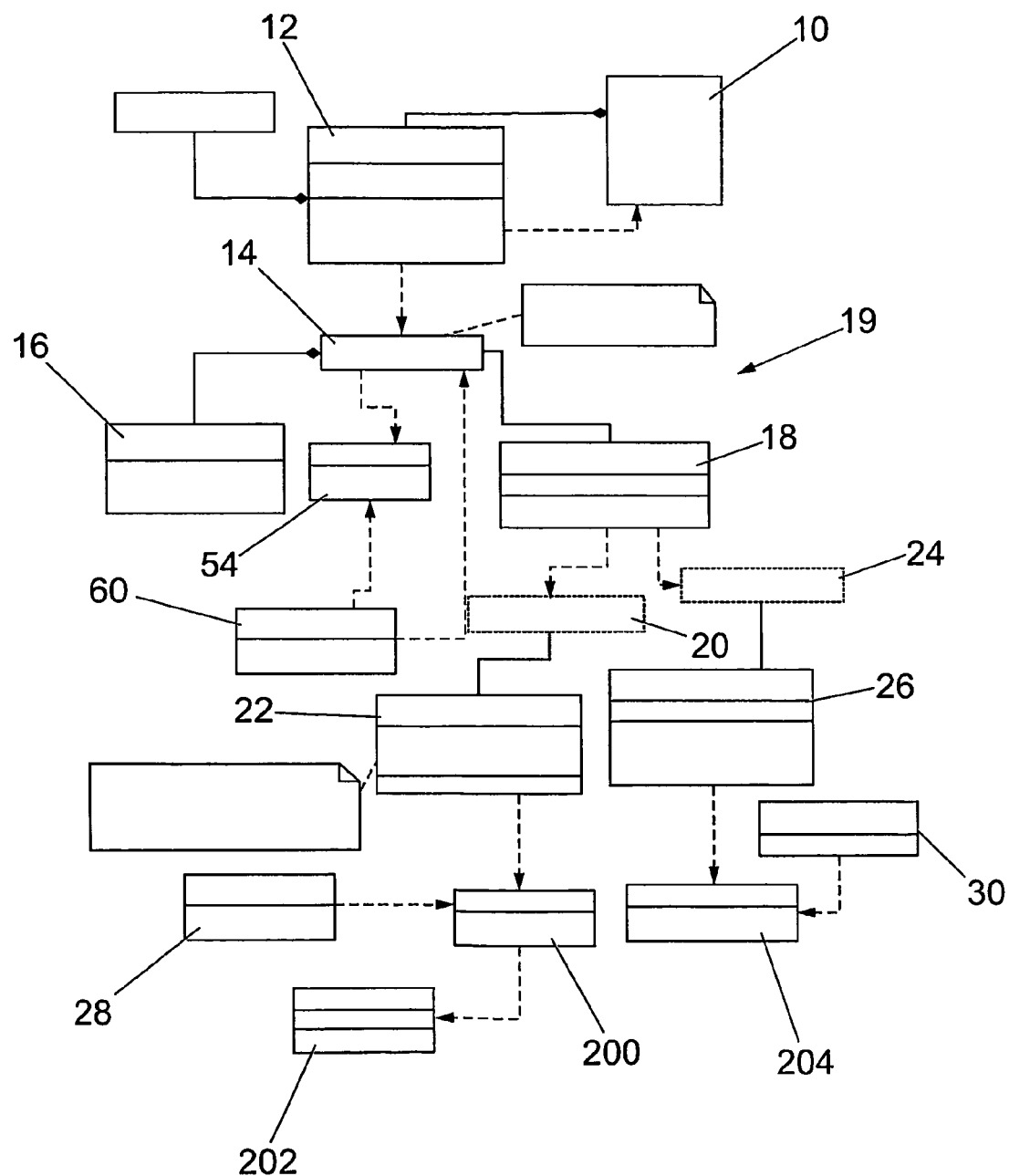
FIG. 1 shows a logical view of an electronic financial transaction system according to a first embodiment of the invention.

FIG. 1 illustrates a logical view of a system according to a first embodiment. A terminal 10 is provided for interaction with an end user of the system. In the illustrated embodiment, the terminal comprises a display, keypad, pinpad, printer, magnetic card reader and integrated circuit card (ICC) reader.

The terminal 10 runs a "microbrowser" software application (microbrowser) 12 which is capable of rendering and navigating pages which are described according to a specified Terminal Mark-up Language (TML), which is described in more detail below.

The microbrowser 12 communicates with a remote host system, which comprises a gateway host 19, a payment application 22 and a configuration service 26.

The gateway host 19 includes a gateway executable application 14. The gateway executable application 14 operates in conjunction with a converter 16 and an HTTP proxy 18. The operation of the gateway host 19 is described below.

The HTTP proxy 18 serves one or more HTTP servers, in this case a first HTTP server 20 which runs a TML payment application 22, and a second HTTP server 24 which runs a configuration WEB service 26.

The first HTTP server 20 distributes and manages a TML application 22, including both static TML pages and the acquirer host's software. The HTTP server 20 is also responsible for providing a private and authorised access to the TML application. While processing terminal submits, the host part of the TML application can interact with other hosts. Any suitable electronic transaction protocol can be used. The choice of protocol will depend on the type of hardware being used, the type of transactions involved, and which protocols are approved or commonly used by financial institutions in the country the terminal is being used in. For example, in the United Kingdom, the APACS 30/50 and/or APACS 40 standards can be used to communicate with an acquirer's host. The TML application can further be updated and configured using a web GUI 28. It also makes use of a database 200 which can be used to maintain a list of terminals and a communications log. The acquirer interacts with an API 202.

The configuration WEB service 26 is accessed via a remote procedure calling (RPC) framework, and can be used to automatically configure the terminal 10. The web service 26 can be updated and configured using a web GUI 30, and makes use of configuration service database 204, which can be used to maintain a list of terminals and a communications log. The microbrowser 12 runs within the terminal 10. Rather than actually implementing the business logic required to complete a transaction, it can be considered as an interpreter of business logic specified by different TML applications. The microbrowser 12 is a terminal application which is specifically configured to be compatible with the specified TML.

Figure 2:
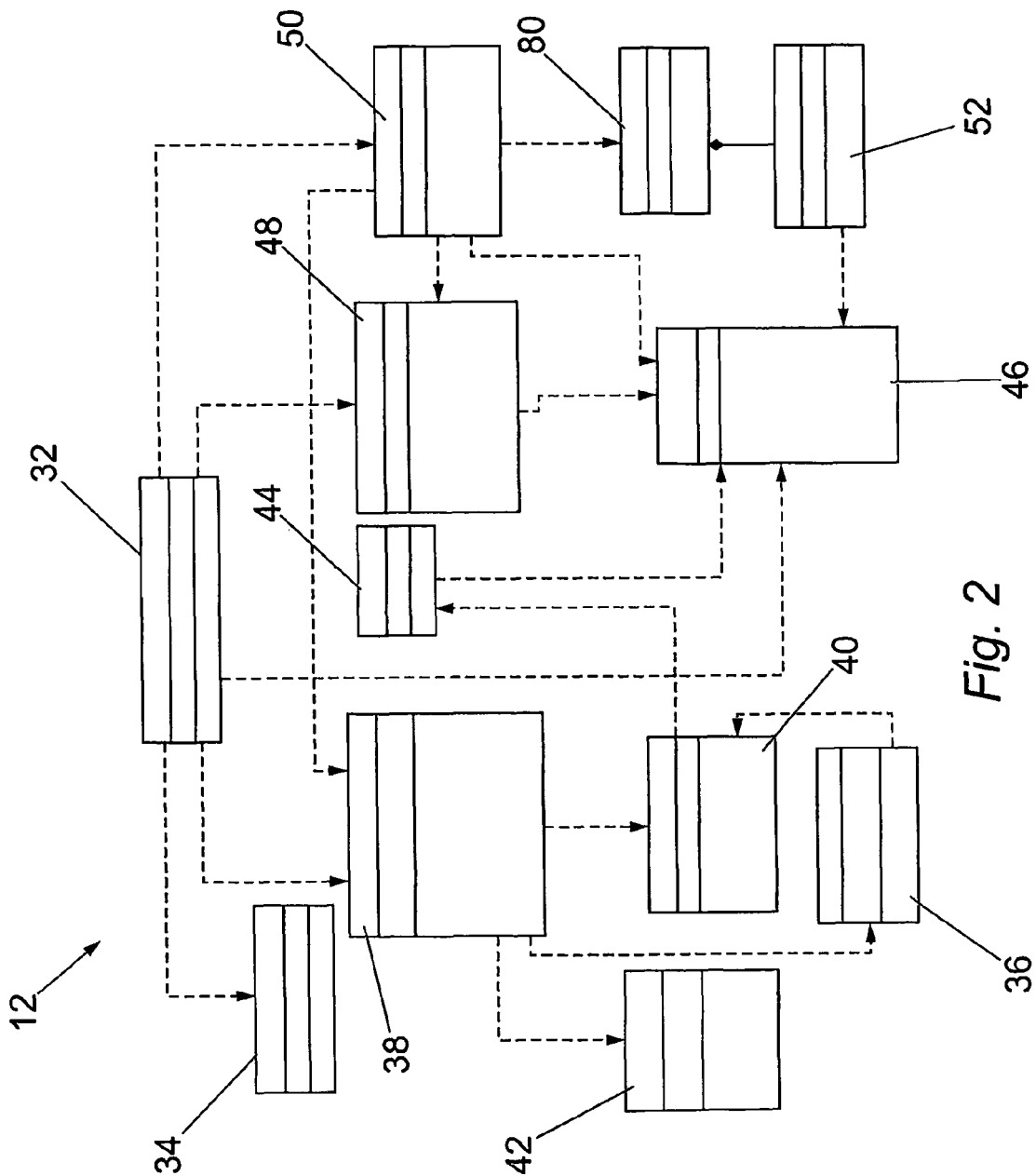
FIG. 2 shows a logical view of a microbrowser application used in the embodiment illustrated in FIG. 1.

FIG. 2 shows details of the microbrowser 12 components, as follows.

A terminal microbrowser application 32 is a wrapper for all the subsystems implemented according to the terminal Operating System (OS) requirements. It contains the microbrowser's 12 main processing loop and is capable of processing OS events.

By default, the microbrowser 12 is started immediately after the OS is loaded. It retrieves an index, or root, URI and starts browsing the page. Alternatively, after a power off event, the state before power-off can be restored. When an "exit" URI is chosen, the microbrowser 12 exits the main loop and passes the flow control to the OS.

The microbrowser 12 can be run in an event-driven application mode, when it processes OS events, such as swiping a magnetic card or inserting a smart card. Every event can be associated with a URI. The microbrowser 12 then starts the main loop with the URI specified for the event.

The terminal microbrowser application 32 is also responsible for displaying to the user the terminal battery charge (where applicable, e.g. for wireless terminal handsets) and network status indicators.

The microbrowser 12 requires no configuration menus. A TML application can change the browser 12 settings by changing the values of TML variables or calling routines. However, the microbrowser 12 includes an embedded TML page which is used to change the browser configuration.

Apart from downloading and browsing TML applications, the terminal microbrowser application 32 also periodically refreshes terminal 10 cache and configuration data, even if there is no data to submit.

As there are no configuration menus and because business logic is removed from the terminal 10, the microbrowser 12 is functionally very simple. From a users perspective, this means that an end user of the terminal 10 or a merchant who wants to use the terminal 10 to process payment can use the terminal in an intuitive and simple manner. However, perhaps more importantly, from the perspective of system integrator, the terminal functionality can be modified and customer support helpdesks can be run without requiring a significant knowledge of complex programming languages. Instead, all that is required is a working knowledge of TML, which provides a user friendly environment.

An initialisation module 34 is used for initialising the terminal, which includes obtaining a unique terminal password and a root security certificate, and for checking data consistency after the terminal is switched on. More details of the terminal initialisation process are given below.

A configuration module 36 is responsible for the terminal auto configuration via a remote procedure calling (RPC) framework. The configuration might include time synchronisation, updating terminal settings (for example, defining URIs corresponding to the events for event-driven microbrowser mode), or downloading parameters for card parsers. The configuration module 36 works with the HTTP client 38 to create an HTTP request with RPC data, and to receive a response, which is then parsed to configure the terminal.

The HTTP client 38 loads and parses resources, each of which is identified by a URI. HTTP parser 40 is responsible for constructing and parsing binary HTTP requests. If other resources are referred from the requested resource, the module 38 retrieves them as well. The HTTP client 38 also keeps a cache of resources, located in a permanent memory of the terminal 10. It first checks to see if the requested resource exists in the permanent memory, and if not found, the resource is then retrieved from or via the gateway host 19.

The HTTP client 38 also submits data to the HTTP server (20, 24 in FIG. 1), either offline or online. It can print all postponed submits stored in the terminal memory, and can cancel submissions. Moreover, the HTTP client 38 may initiate the terminal 10 auto configuration every time it connects to the gateway host 19. A web services converter and stubs generated to meet the configuration module requirements are included in a remote procedure calling library (not shown).

The HTTP client 38 communicates through a secure terminal protocol (STP) interface 42, which can open or close the connection, send a request with several wrapped HTTP packets, and receive responses. The interface 42 can utilise TLS, IP stack and a cryptographic library (not shown).

A TML parser 44 is provided for parsing TML pages. It verifies the page format, declares the variables introduced in the page, and converts TML to the format appropriate for rendering and processing (for example, C structures).

The TML parser 44 (among other microbrowser 12 modules) makes use of a variables library 46 which allocates space for new variables in different scopes, creates predefined variables, processes <setvar> elements associated with the screen, retrieves a variable value for the specified variable name and scope, changes variable values, and deletes all variables introduced in the page specified by the URI.

The variables library 46 is also used by a rendering and navigation module 48 which is responsible for rendering display screens including scrolling up and down and highlighting active links; navigation through links and form elements; printing print screens; rendering message screens and form prompts (on the terminal display); and rendering forms with an <input> element, including proper rendering of checked and not checked checkbox elements and paging up and down.

A form processing module 50 is provided to process the form and submit screens. It accepts and checks user input, assigns the input to the variables and constructs TML submits. Data is not erased until it has been submitted to the HTTP server (20,24) and an acknowledgement has been received, unless it is intentionally erased by a user. Until it is erased, the data can be stored in the terminal's permanent memory, so that it is not lost in the event of the terminal 10 being switched off. This also means that the forms can be processed even if the host in the customer's domain is inaccessible. Thus, a communication failure will not result in a freezing of the terminal 10 or gateway host 19.

Posts kept in the microbrowser 12 memory may be printed, cancelled or pooled off (either at the next connection the microbrowser 12 makes with the host, or at the behest of an end-user). These functions are supervisor protected via a passworded manager's menu. These passwords are randomly generated for each terminal and are stored in the gateway host 19 in a database with connection certificates (as described below).

A card parser module 52 is responsible for parsing magnetic tracks of cards, and for interpreting the interaction with ICC (smart) cards. The card parser module can be configured during terminal auto configuration. The operation of this module is described in more detail below.

The gateway host 19 is a Java host application, comprising a gateway executable application 14, an HTTP proxy 18, and a converter 16. The gateway executable application 14 provides functionality including issuing a unique terminal password (which is used for further terminal authentication) for every new terminal introduced to the network, providing the terminals with a root certificate, and authentication of each of the terminal(s) and HTTP server(s) to each other.

The gateway executable application 14 together with the converter 16 take a maximum of 100 ms to process one request in both directions from the terminal 10, plus back conversation. The gateway host 19 aims to be robust enough to be available 99.9% of the time, which means that there should only be about 9 hours of downtime per year.

The HTTP proxy 18 provides functionality including establishing HTTPS or HTTP connections on behalf of the terminal 10 to the HTTP servers 20,24 which run the TML application and configuration services.

The converter 16 is a pluggable component which converts HTTP and XML data from text to binary format and vice versa, and converts images from standard bitmaps to a format that can be rendered by the terminal 10.

The gateway host 19 also provides for the caching of static TML pages and configuration data (in database 54), in order to increase efficiency of terminal request processing and to keep the pages up to date.

Figure 3:
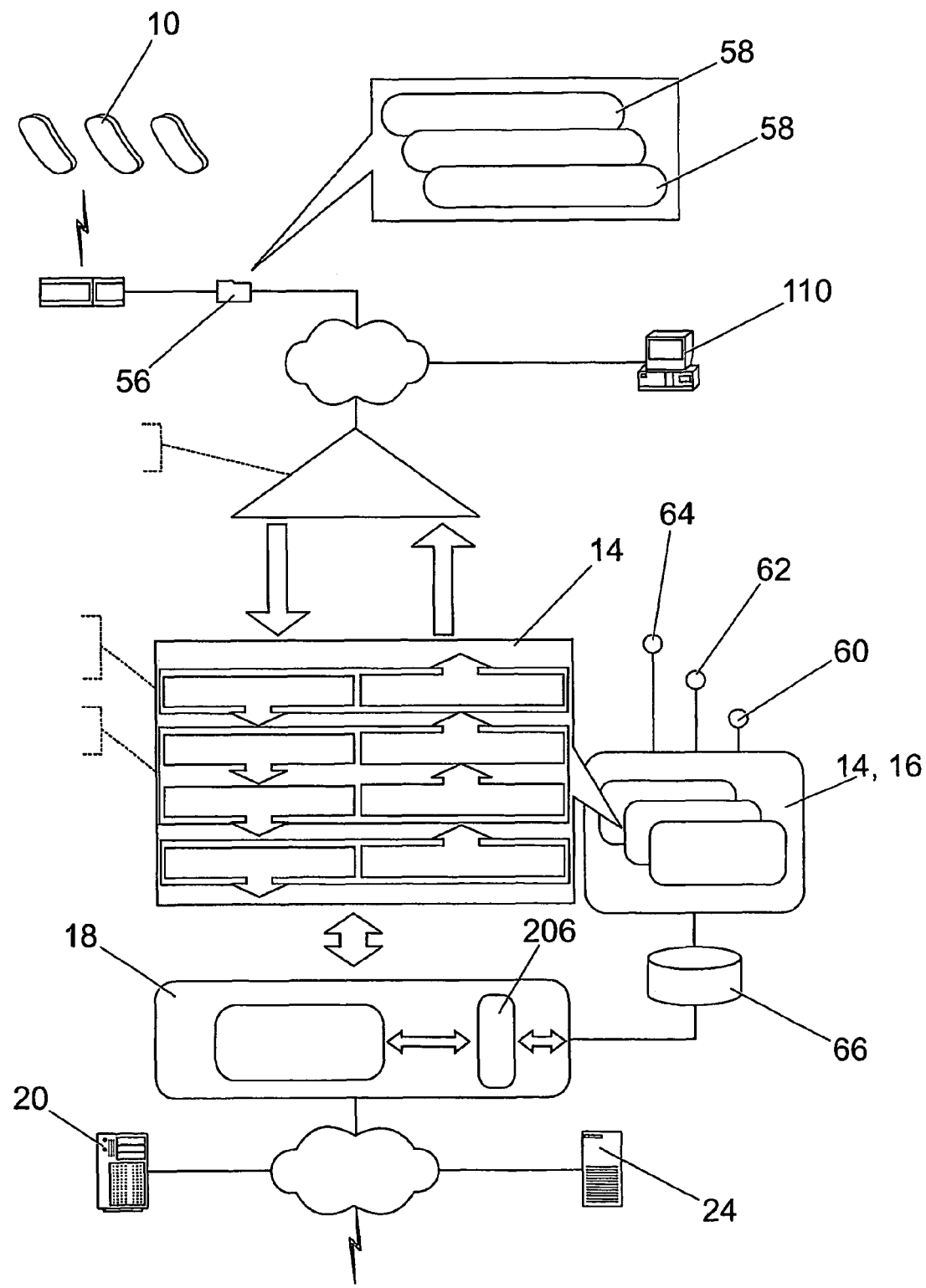
FIG. 3 illustrates the functional structure of a remote host system used in the electronic financial transaction system of FIG. 1.

FIG. 3 shows more detail of the gateway host's structure. The gateway executable application 14 is shown as a TCP/IP listener. The gateway executable application 14 processes each terminal session in a separate thread (STP session) for every incoming TCP/IP connection. The STP request 56 is transferred to the converter 16 and forwarded to one of the servers 20,24 via the HTTP proxy 18.

The gateway executable application 14 calls the converter 16 for every HTTP request 58 wrapped into the STP packet 56. As noted above, the converter converts HTTP and XML data from text to binary format and vice versa. However, the converter 16 in fact comprises a number of "sub-converters", including a binary HTTP converter, a generic binary XML converter (which can be parameterised with code tables), a TML converter (which is a parameterisation of the generic XML converter for the particular version of TML), an image converter, and a web services RPC converter.

Which converter is called depends on which BHTTP request 58 is extracted from the STP request 56.

For an STP request, the converter must determine the content type of each extracted BHTTP request. As the request comes from the terminal 10, the TML converter can be used for all calls other than those identified as being web service calls, in which case the web services sub-converter is used. However, for an STP reply, the content type can be of many different formats, and the appropriate sub-converter from any of the available sub-converters must be determined before the reply is packaged. Just as for the STP requests 56, an STP reply can include a number of BHTTP replies.

Figure 4:
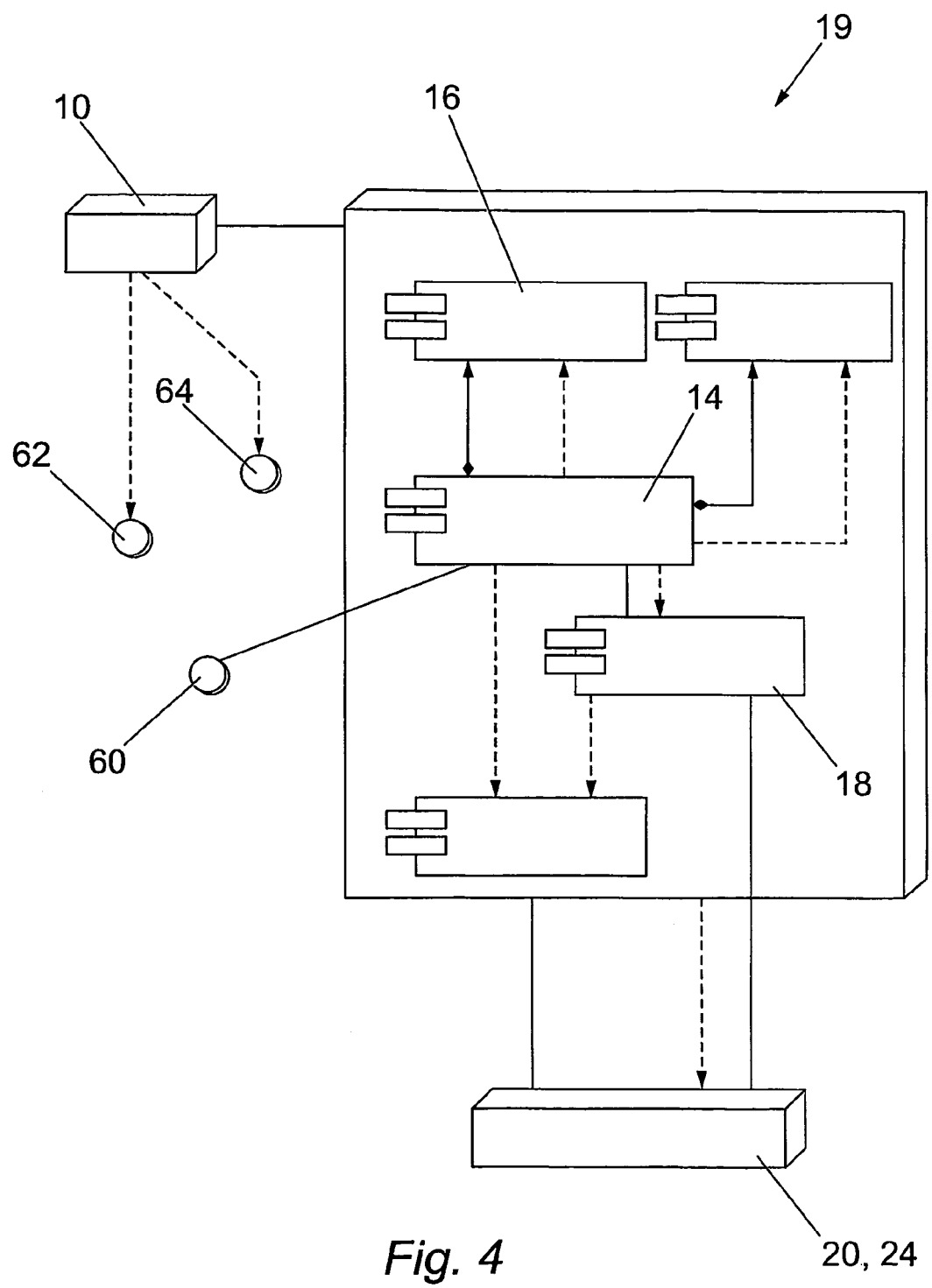
FIG. 4 illustrates the components of the remote host system shown in FIG. 3.

The subcomponents that are used in the gateway host 19 are shown in FIG. 4, in which like components are illustrated with like reference numerals as seen in FIG. 1.

The components of the gateway host 19 are deployed within a secure intranet. However, the other components of the system may be situated outside of the intranet and so all communication channels between the gateway host 19 and these parts must be carefully protected. To this end, a protocol stack can be used wherein a terminal 10 uses binary HTTP for sending a request 56. Lower level requests are packed in STP and then transferred over TCP/IP with TLS tunneling. During initialisation, the terminal 10 uses only the lowest secure tunneling level without BHTTP and ISTP. Note that when establishing a TLS session, the gateway host 19 sends its security certificate to the terminal 10 for authentication. More details of appropriate protection measures are provided below.

The operation of the gateway host 19 will now be described in more detail.

Configuration parameters for the gateway host 19 relate to the gateway executable application 14 itself, and are common for all connected terminals 10. The configuration parameters can be derived either from configuration files, which are loaded when the gateway host 19 starts, or from a remote interface, such as a web GUI 60 (see FIG. 1) wherefrom the gateway host 19 may receive instructions to change some of the initial settings. If common settings are changed, they only take effect for terminals 10 that are connected after the change has taken place.

A request for initialisation of a new terminal 10 is handled (in a separate thread) via an initialisation port 64. Each terminal has an associated unique terminal ID (TID), which can for example be an eight digit string. The TID is sent to the gateway executable application 14 with the initialisation request. The gateway executable application 14 then matches up the supplied TID of the terminal 10 with its records in order to verify the credentials of the terminal 10 making the request. If verified, a unique password is generated, which is sent to the terminal 10 together with the root certificate (described below). The database 66 is then updated to record the terminal 10 as being activated.

The gateway executable application 14 listens to requests from initialised terminals 10 via a data exchange port 62. A terminal session starts on every terminal request to data exchange port 62 and runs in a separate thread. Each session comprises steps of terminal authentication, sending the terminal's request to the HTTP servers 20,24, and sending the reply from the HTTP servers 20,24 back to the terminal. Session activity can also be logged.

The terminal's TID is sent to the gateway executable application 14 with the request. The gateway executable application 14 then performs a number of iterations of an encryption algorithm on the password that is associated with that TID. Suitably, the encryption algorithm used is the arcfour algorithm, and four iterations are used. However, it will be appreciated that other algorithms and/or a different number of iterations could be employed. The resulting answer represents a control answer. The terminal 10 is then requested to perform the same number of iterations of the same encryption algorithm and send this as a reply to the gateway executable application 14. If the replies do not match, the gateway executable application 14 closes the connection, otherwise, a new session ("STP session") is created and assigned to a separate thread.

If errors occur at any stage of transmitting the terminal 10 request to the HTTP server 20,24, or in transmitting the reply from the HTTP server 20, 24 to the terminal 10, these are reported in a reply packet and also logged in the database 66. A fault report could, for example, be generated if there are too many threads being processed by the gateway executable application 14 at the time of the request, if there is a timeout or a communication failure, or if the converter 16 is unable to process the request. If the connection between the HTTP server 20, 24 and a web services host is not completed successfully, the STP connection is still regarded as being successful, but the reply package includes a warning message.

The fault reports and warning message comprise text or an error code that gives information about where the failure occurred and the reasons for the failure.

Information relating to each session can be logged, through a common logging interface, into the database 66 and in the memory of the terminal 10. The logged information can, for example, relate to the start and end times of STP and other sessions, terminal information, details of ports used, and details of the HTTP requests. It will be apparent that any other suitable logging information can be collected, and used for diagnostic purposes, as required.

The operation of the server can be stopped, either in "normal" circumstances, whereby all requests in the overall system are processed before the gateway host 19 shuts down, or in "emergency" circumstances, whereby only the STP requests, that is, the requests between the terminals 10 and the gateway executable application 14, are completed.

Remote management is available through remote interface 60 via remote method invocation (RMI). Functions available via remote management include getting and changing gateway host 19 configuration parameters (including ports used, STP session parameters (timeout), HTTP proxy host and port information); getting gateway host 19 activity statistics; and stopping the gateway host 19.

Figure 5:
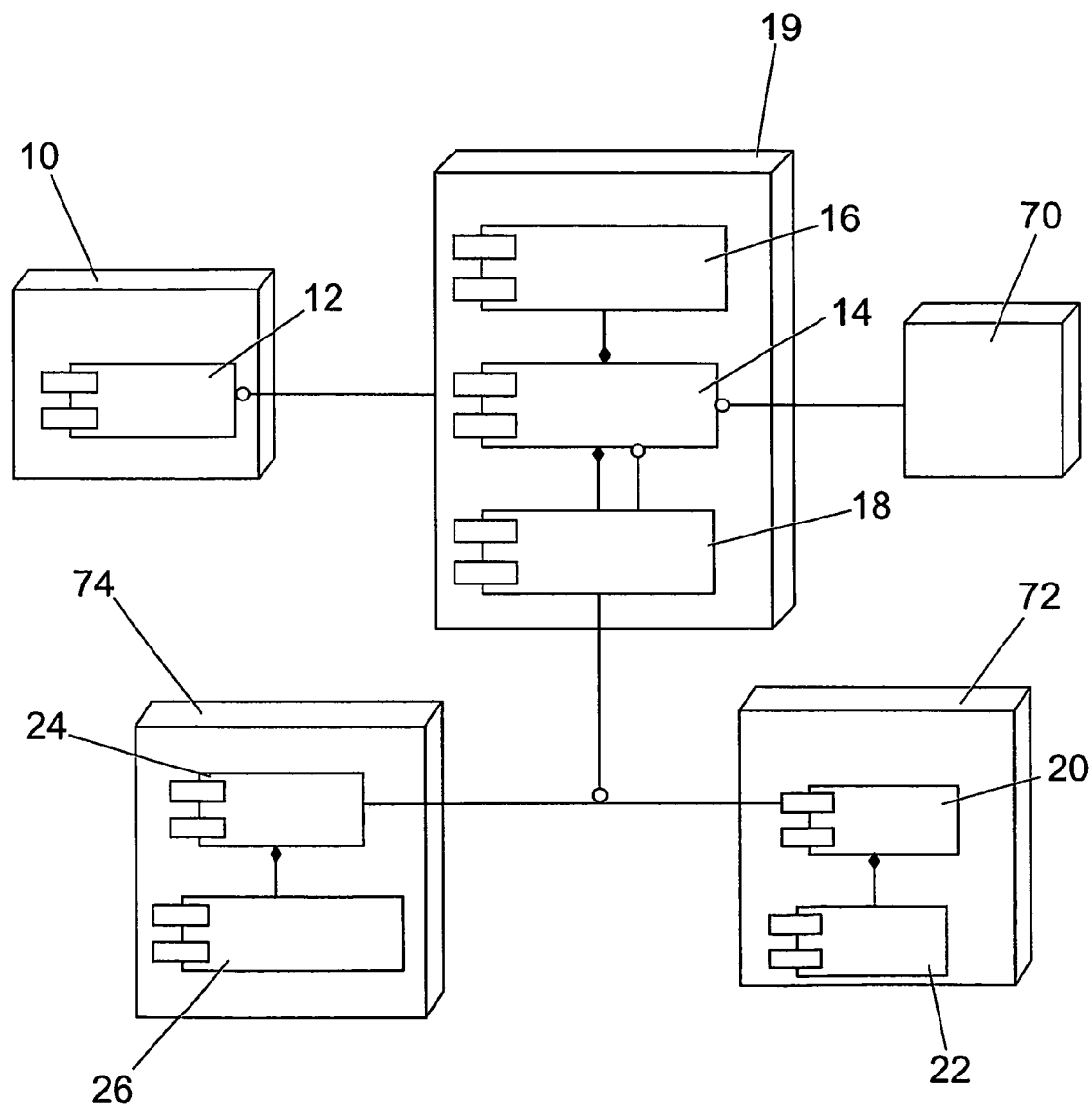
FIG. 5 illustrates an example of a physical deployment of components of the electronic financial transaction system shown in FIG. 1.

FIG. 5 shows an example of a physical deployment of the system components described above, with like components identified with like reference numerals as seen in previous diagrams. The components communicate with each other via TCP/IP, with the remaining functionality, including security mechanisms, built on top of the TCP/IP layer in the protocol stack.

The gateway host 19 communicates via the gateway executable application 14 with a certification authority 70, as is described in more detail below. The first HTTP server 20 and TML application 22 are both part of a TML application host 72, and the second server 24 and configuration service 26 are both part of a WEB services host 74. Note that FIG. 5 does not show auxiliary components, like web interface hosts, database servers, etc.

It is to be noted that the implementation shown in FIG. 5 is only a sub-section of a particular example implementation. The components of the system can be distributed over a greater or lesser number of computers. Even the microbrowser 12 may not actually run within the terminal, but be emulated using a terminal simulator.

The overriding concern that should be taken into account when deploying the framework is security. If it is not possible to connect some components using secured network protocols (for example, the gateway executable application 14 and the HTTP proxy 18 communicate using HTTP instead of HTTPS), these components should be placed within a private network and behind a common firewall to reduce the risk of external attacks on the system.

As described above, the card parser 52 (a component of the microbrowser 12) is responsible for parsing magnetic card tracks and for interaction with smart cards. The operation of this parser 52 will now be described in more detail.

The card parser 52 provides a simple and generic means for the TML application running on the microbrowser 12 to interpret data from the card reader which is part of the terminal 10. The parser 52 makes use of a library 80 (see FIG. 2), and functions to read and parse data from a card; verify the card and cardholder; and to implement a risk management policy. The parser 52 can also be configured during terminal auto configuration.

The card parser 52 provides only one interface method for the TML application running on the microbrowser, which has only a single string parameter. This string usually is just a command, which should be executed by the parser 52. All other information is passed to or obtained from the parser 52 by the variables defined in the TML.

Figure 6:
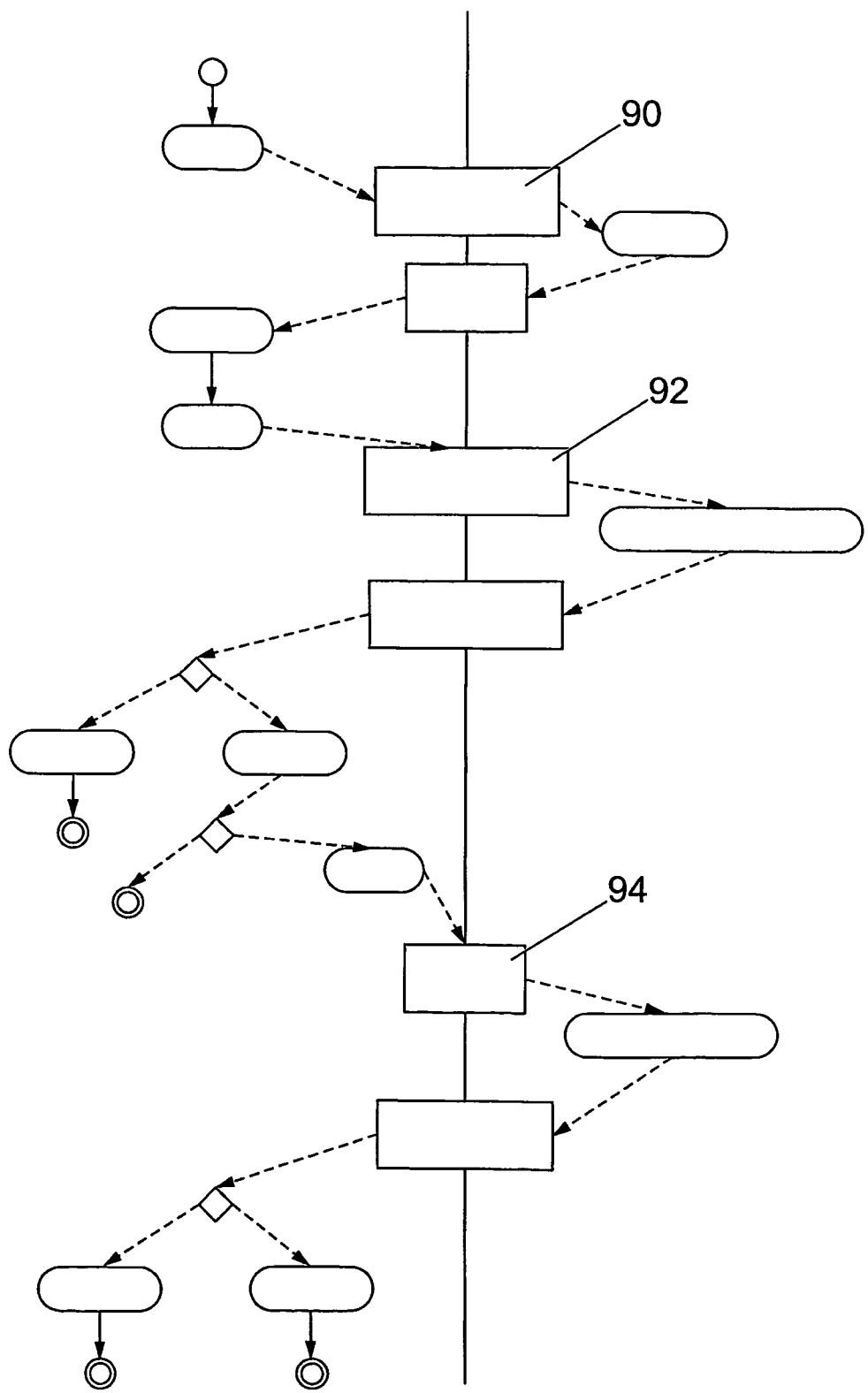
FIG. 6 illustrates a process flow showing how a magnetic card is processed by the electronic financial transaction system of FIG. 1.

The processing of a magnetic card is illustrated in FIG. 6. In substance, the steps carried out while processing a magnetic card are standard. However, the way in which a electronic financial transaction system implemented according to an embodiment of the invention carries out this known task is non-standard, and will now be described.

The TML application running on the microbrowser 12 may utilise parser functionality via a <tform> screen with a <card> element. The name of the parser to be called is specified in parser attribute of these elements and the parameter is specified in parser_params attribute.

In the event that parsing cannot be completed, the parser 52 fills a baddata_reason variable and the message specified in a <baddata> element is rendered, which gives the user feedback as to the reasons for the failure.

In use, the TML application first calls the parser 52 and waits for card insertion, establishing of the context, reading of the card data and verification of the card itself. After this, the TML application may analyse the variables filled by the parser, and if necessary, ask the user for additional data corresponding to the transaction, and call the parser 52 again. During further calls the parser 52 may perform a risk management process, perform further interactions with the card, etc. and fill other TML variables. Moreover, the parser 52 may be asked to perform some particular actions with the card—for example, verifying the PIN of an ICC (smart card).

The parser 52 may be configured to support a context related to the transaction in process and should review this context for each new card used.

Additionally, the parser 52 may support statistics about all transactions (for example, current amount of offline transactions for the risk management). The HTTP client 38 informs all parsers (40,44,52) when postponed submits are pooled up to the server to allow them to reset their counters.

The card parser 52 actually comprises a number of "sub-parsers" for parsing different types of card.

These sub-parsers include a magnetic card parser, an ICC EMV parser, and an ICC initialisation parser.

The magnetic card parser deals with cards with standard ISO tracks. It may read tracks from the card, parse them, and verify the card number and card expiration date. Additionally, it performs a risk management process based on per-scheme floor limits (i.e. specific value limits used to determine which transactions must be authorised). For this purpose it tracks approved offline payment transactions.

The magnetic card parser reads and updates variables that are well known for parsing magnetic card data. In addition, a card_parser string variable is defined. When a magnetic card is read, this variable should be filled by the parser 52 to "mag". Also, a card_input_mode integer variable can be defined. For example, the integer value 1 could represent the swiping of a magnetic card, 2 could represent the use of an ICC, and 3 could be used to represent the entering of card details using the terminal keyboard. When the parser 52 is called with the command "read_data", this variable should be set to 1. If the parser 52 is called with the command "risk_mgmt", this variable should be checked, and if it is 3, card number and expiration date should be verified and a variable representing the partial card number to be printed on the receipt should be filled.

It will be appreciated that the names given to these variables, and the number and allocation of possible values could be varied without changing the functionality of the variables.

The parser 52 supports two commands which are visible to TML application: a "read_data" command 90 and a "risk_mgmt" command 92. During "read_data" command 90 the parser reads ISO tracks from the card, parses them and fills "card_*" and "iso*" variables, which give details of the card and the information carried on the card's ISO tracks. Moreover, the parser verifies the card number and expiration date and generates "bad data" condition, if necessary.

After issuing of the read command 90, the TML application asks the merchant about the transaction amounts and transaction type. This information is necessary to make a decision about online processing, offline processing or transaction declaiming. A verdict variable is filled by the TML application which allocates the transaction processing mode, i.e. offline or online, or rejected.

If card details are entered manually using the terminal keyboard, the "read_data" command 90 is not issued and TML application should set the card_input_mode variable to 3.

The "risk_mgmt" command 92 is used by the TML application to ask the parser to perform a risk management process. During this process, the parser 52 analyses transaction amounts and type, card scheme and issuer and its internal statistics and makes a decision taking into account recommendations defined by the TML application. For example, the transaction may be rejected if manually entered card details are incorrect. The verdict and the reason for the rejection are returned to the TML application.

The "risk_mgmt" command 92 is also used when data posting fails during an attempted online posting. The parser 52 discovers this situation via an "econn_reason" variable 94 which is filled by the HTTP client 38. The risk management process is run again, and the configured policy is used to either approve offline processing or cancel the transaction.

The ICC EMV parser is intended to interact with ICC (smart) cards supporting EMV payment application. It is responsible for application selection; static and dynamic offline data authentication; card capabilities discovering; offline PIN verification; EMV risk management; generation of TC, AAC, ARQC and other data necessary for transactions to be made under the chosen electronic financial transaction protocol (such as APACS); executing of the issuer script and retrieving of the results.

The ICC EMV parser reads and updates variables that are well known for interpreting ICC data. In addition, the card_parser string variable and card_input_mode integer variable as are used by the magnetic card parser are also used. Following the example set out above, the card_input_mode integer variable should be set to 2, and the card_parser string variable should be filled by the parser to be "icc-emv".

Figure 7:
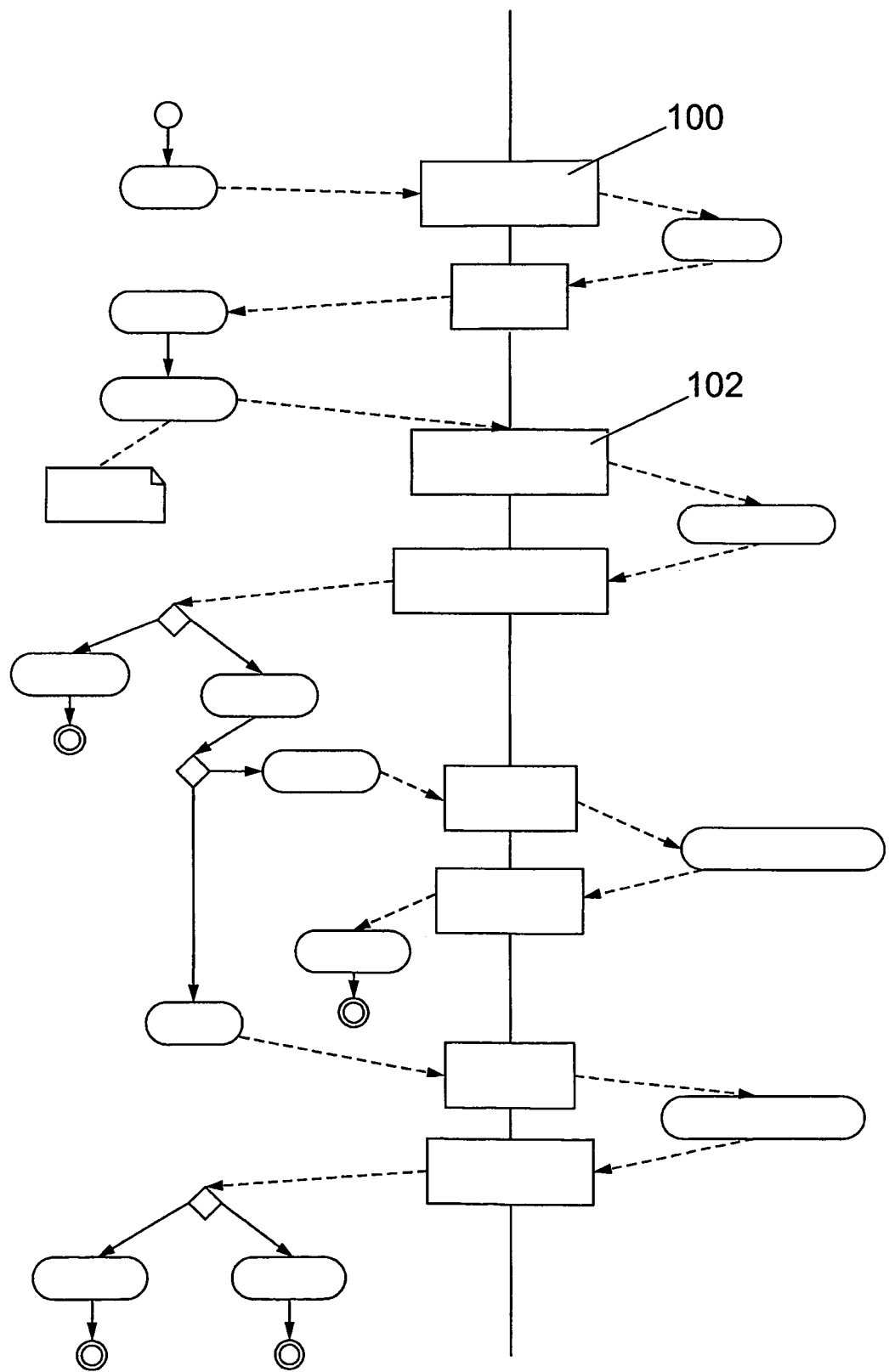
FIG. 7 illustrates a process flow showing how a smart card is processed by the electronic financial transaction system of FIG. 1.

The operation of the ICC EMV parser is illustrated in FIG. 7. In substance, the steps carried out when processing an ICC (smart card) are standard. However, the way in which a electronic financial transaction system implemented according to an embodiment of the invention carries out this known task is non-standard, and will now be described.

The first command issued by the TML application to ICC EMV card parser is an "init_app" command 100, used for initialising the ICC application. During processing of this command the parser should perform application selection, read application data and perform static or dynamic offline data authentication. As the result the parser should fill the appropriate TML variables which relate to card and ICC application details.

As further commands also interact with the ICC, the card should remain inserted into the card reader during processing of the transaction.

After initialisation the TML application must verify the cardholder. It asks the merchant about transaction data (amounts and transaction type) and issues a command to make the parser retrieve from the ICC a list of cardholder verification methods and store these methods in a "cvm" variable. For example, possible card verification methods include online PIN verification performed by the host, PIN verification performed by the ICC card itself, verification of the PIN by the ICC together with signature verification by the merchant, or no cardholder verification required. Furthermore, when an offline PIN verification is supported by the ICC, the key to be used for PIN encryption is retrieved by the parser and stored in a dedicated variable. Biometric ID verification methods can also be supported.

The TML application then fills a card verification result variable, which can confirm success, or be set to a number of different options giving different reasons for failure.

If a method involving signature checking is chosen, the TML application switches to a <print> screen to print a receipt with a signature request. The merchant is then asked to verify the cardholder signature. If the signature is bad, the parser should be asked about the next cardholder verification method.

A risk management process is then run, which, in a similar fashion to that of the magnetic card parser, decides whether to carry out the transaction online or offline, or to reject the transaction based on the configuration parameters. In the specific example of the ICC EMV parser, variables relating to ICC transaction numbers and cryptographic details, as well as data about the ICC and verification results should be posted to the gateway host 19.

If the verdict from the risk management process is that an online data submission is to be made, the TML application performs an authorisation step, obtaining an application authentication cryptograph (AAC) and transaction counter (TC) from the ICC. Once the result of this authorisation is confirmed as successful, the card is deactivated.

A separate parser is also provided for interaction with an ICC during blank terminal initialisation.

The system can accommodate the use of a terminal simulator 110 (see FIG. 3). This provides developers of both the TML application and the system developers with a useful tool for producing demos and debugging TML applications. From the point of view of the TML application developers, the simulator looks like a terminal 10 with a loaded terminal microbrowser application 32. It can be run as an executable Windows file and interacts with the gateway host 19 in the same way as a normal terminal. From the point of view of the system developers, the simulator 110 can be seen as a library, which can be linked to microbrowser application code, thus allowing microbrowser debugging on a PC platform, and also allowing experimentation to aid in future development.

The simulator 110 should not emulate the terminals' 10 architecture or operating system. It is only required to emulate the OS libraries used by the microbrowser (responsible for interaction with terminal peripherals, cryptography, handling events and messages, etc.) and to implement the run-time environment for the terminal microbrowser application (i.e. application manager).

TML is an XML-based language which shares some features with XHTML and with WAP WML. It is used to define both static and dynamic content loaded to the terminal, as well as the data posted by terminals to the HTTP server.

A TML application can comprise several pages. Usually, there is a root page from which all other pages are referred using a standard XHTML <link> element. Static pages can be pre-loaded, which then prevents the terminal needing to connect to the host every time a URI referring to the static information appears. The Cascading Style Sheets (CSS) specification, which is used for rendering TML pages, should be referred from every page. By default, the built-in CSS is used. Images appearing on a particular page should also be referred using the <link> element.

Style directives and style grouping <span> and <div> elements are preferably not allowed in TML. Styles for an element can be specified using "class" and "id" attributes. Scripts are also preferably not supported.

Each TML page consists of several screens or browser processing units. Every screen has an URI, which is constructed from the URI of the TML page and the screen identifier. Screens are introduced to speed up downloading TML applications to the terminal, since multiple screens can be wrapped into a single TML page. Moreover, each page restricts the scope of local variables defined within it.

A number of different screen types can be used, which can include display, print, message, form, and function call screens.

A display screen can be considered as a usual HTML page. It can contain hyperlinks, and can be scrolled up and down. It is always rendered on the terminal display.

The content of a print screen is HTML-like as well, but is printed using the embedded terminal printer. After printing, the microbrowser switches to the specified URI. Hyperlinks are ignored.

A message screen is used for rendering error, warning or success messages. The message is rendered on the terminal display for a specified number of seconds. After the time elapses, the microbrowser switches to the specified URI. If a user presses a key, the microbrowser 12 switches to the next screen immediately.

Terminal form (or submit) screens are used for collecting, handling and submitting the user input. These are described in more detail below.

A function call screen is used for calling the terminal C functions by name. This option is required for TML pages which contain menus for the terminal or microbrowser-configuration.

TML features numerous block-level and text-level elements, which are similar to those in XHTML. Most of them have the same syntax and semantics as in XHTML, but there are some important restrictions and enhancements.

For example, HTML4 frames are preferably not supported in TML. Also, in addition to the attributes used in HTML4 for the <input> element (i.e. text, password, checkbox, radio, submit, reset, button), an additional attribute is allowed to specify the input device, i.e. the usual terminal keypad, or a pinpad.

TML variables can be either predefined (like date and time) or declared by the user. The scope of a variable can be either restricted to a single TML page or can be defined as being global. The type of a variable can be defined to be any of string, date, integer or opaque (binary data).

TML variables can change their values when the microbrowser switches to a new screen, using a <setvar> element. This element is also used for assigning user input information to the variables as well. TML screens for rendering on the terminal display or printing using the embedded printer can include references to the variables. While rendering or printing, the references are replaced with the corresponding variables values.

The terminal can submit the variables' values to the HTTP server where they are processed by the TML application.

Variables are also used for storing system and microbrowser settings. The TML application is able to change the variables' values in order to update the microbrowser configuration.

TML element <tform> has been introduced to describe the data that can be entered by the user. The users can enter the data by swiping a magnetic card, inserting a smart (ICC) card, using a pinpad keyboard, or using the terminal keyboard.

Text data entered by the user is marked up with XHTML <input> and <textarea> elements. The elements which are used to markup the keyboard input should be always wrapped into a simplified XHTML <form> element. This allows the use of several <input>, <textarea> and <number> elements in a single form to be placed inside other XHTML elements (tables, lists, etc.).

The entered data is assigned either to the predefined (e.g. "pin", "cardholder", etc.) or user-defined variables. TML allows the evaluation of the entered data, which can include matching the maximum/minimum value or string length, and also verification of card details including card number and/or expiration date.

If the data is incorrect, the terminal should render an error message, which is specified by a <baddata> element, and switch to the form screen.

Instead of being immediately submitted to the HTTP server, the data entered by the user during processing of the form is submitted to the server using the submit screen. The submit screen specifies the values of the variables to be sent to the HTTP server, which may have been collected in multiple previous screens.

Submissions can be either off-line or online. Online submission assumes that the terminal 10 immediately connects to the gateway host 19 and submits the data. For off-line submission, the terminal 10 constructs the corresponding <tmlpost> element and stores it in the terminal permanent memory. The postponed submissions are transferred to the gateway host 19 during the next terminal/gateway executable application session.

Every submit screen specifies a destination URI for submission. The data submitted by the terminal 10 is processed by the gateway host 19 before being posted to the HTTP server where it is processed by the TML application. The TML application then validates the received data and generates a response.

Submit elements also include a URI, specifying the location within the code where the microbrowser should switch to upon successful submission. For online submits, the URI to switch to if the submission fails should also be specified. Moreover, the TML application can generate a response with a "see other" response code to force the microbrowser to switch to another specified URI or to generate a response with a dynamic TML content (for offline submits such a response is ignored). The TML forms support the functionality of terminal devices including a graphical display, keypad, embedded printer, pinpad, magnetic card reader, smartcard reader, and offline secure PIN entry. In order to support different formats of smartcards and different modes of parsing magnetic tracks, there are TML tags that allow the plugging of different parsing routines, for example to take account of the different types of data that are found on different types of smart card.

It is possible to store more than one TML application in the permanent terminal memory dynamically. The TML application in its binary form persists in the terminal memory after rebooting. The TML application is also cached in the TML microbrowser. The microbrowser reloads the cached TML page automatically if the TML page has been changed within the HTTP resource container or if the TML page has expired. The TML microbrowser reloads cached static content every time it connects to the gateway host 19 for submitting data or for getting dynamic TML content.

Every page that should not be cached or reused is marked with an attribute "no-cache". Such pages are deleted from the terminal memory at a point just before the microbrowser 12 starts to process the next page. The attribute "no-cache" is very similar to the HTTP "no-cache" directive.

Similarly, the pages that should be cached are accompanied with "ETag" HTTP header generated by the gateway host 19.

The gateway host 19 is responsible for caching the TML pages and maintaining the cache of all resources loaded to terminals (including generated E-tags) up-to-date. Every time the terminal 10 connects to the gateway host 19 it sends a conditional HTTP GET request with ETags for every cacheable resource stored in the terminal memory. The gateway host 19 can either reply that the resource has not been changed or send a new version of the resource.

A user with administrative rights is allowed to remove all resources cached within the terminal.

The host part of TML software represents a set of Java applications identified by URIs. These URIs should be specified as a destination for submit elements. The HTTP server calls Java applications to process requests to the specified ports received from the terminals via the gateway host 19. The applications process the requests and generate the corresponding HTTP responses which are returned to the terminals 10.

While processing the requests, the TML application can interact with other hosts (for example, with an acquirer's host using an appropriate electronic financial transaction protocol, such as the APACS 30 standard).

A basic TML payment application 22 is a component of the system which can be used as a base for developing proprietary TML applications. The application comprises several (2-3) TML pages and a Java host application communicating with the acquirer's host. The application preferably has a web interface for remote monitoring and control.

Aspects of the system's use and behaviour will now be described in more detail.

The terminal 10 downloads static pages of TML application from the HTTP server 20,24. These are then stored in the terminal's cache, so that they do not require to be re-loaded until the application needs modified.

Figure 8:
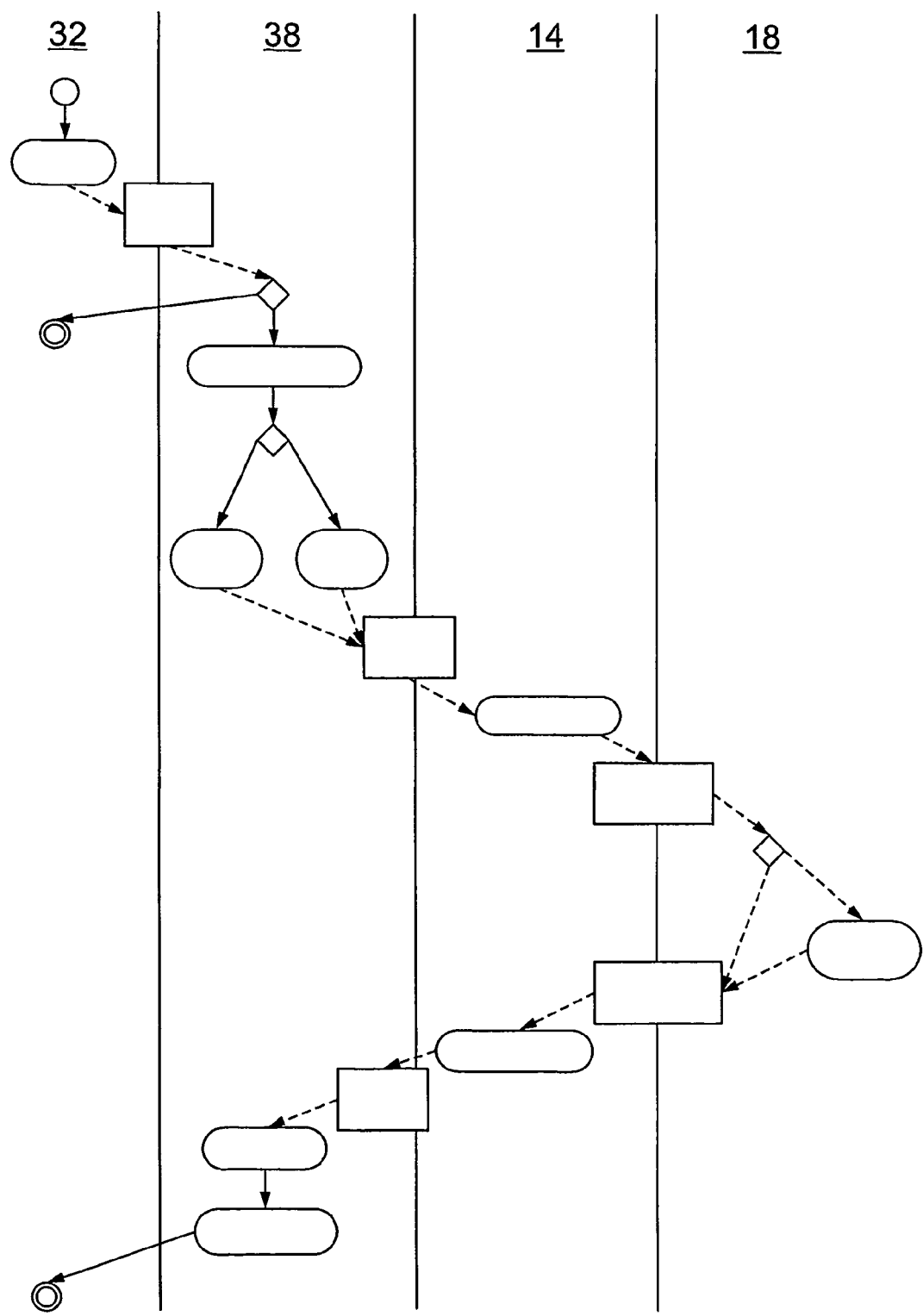
FIG. 8 illustrates a process flow showing how a page of content is downloaded by a terminal used in the electronic financial transaction system of FIG. 1.

FIG. 8 illustrates how the terminal 10 downloads a TML application from the gateway host 19. The terminal 10 connects to the gateway host 19 using a secure transmission protocol (STP).

The microbrowser 12 detects that the requested resource is missing (usually after the initial loading or when following a hyperlink). The HTTP client 38 checks whether the requested resource exists in the terminal 10 cache and is up-to-date. If yes, the resource is retrieved from the terminal's 10 cache and returned to microbrowser 12. If no, the HTTP client 38 constructs a binary HTTP GET (conditional or unconditional) request with the specified URI and sends it to the gateway executable application 14. The converter 16 then translates the received request and sends it back to the HTTP server 20, 24 via the HTTP proxy 18. The proxy 18 either retrieves the requested resource from its cache 206 (see FIG. 3) using the URI identified in the request or establishes a connection to the specified HTTP server 20,24 and forwards the request to the server 20,24, which then responds with the requested TML page sent in text XML format. The converter 16 then translates the XML page to the binary XML format and sends it to the terminal 10. The terminal 10 parses TML markup and (if necessary) loads linked TML pages, CSS, images, etc.

Figure 9:
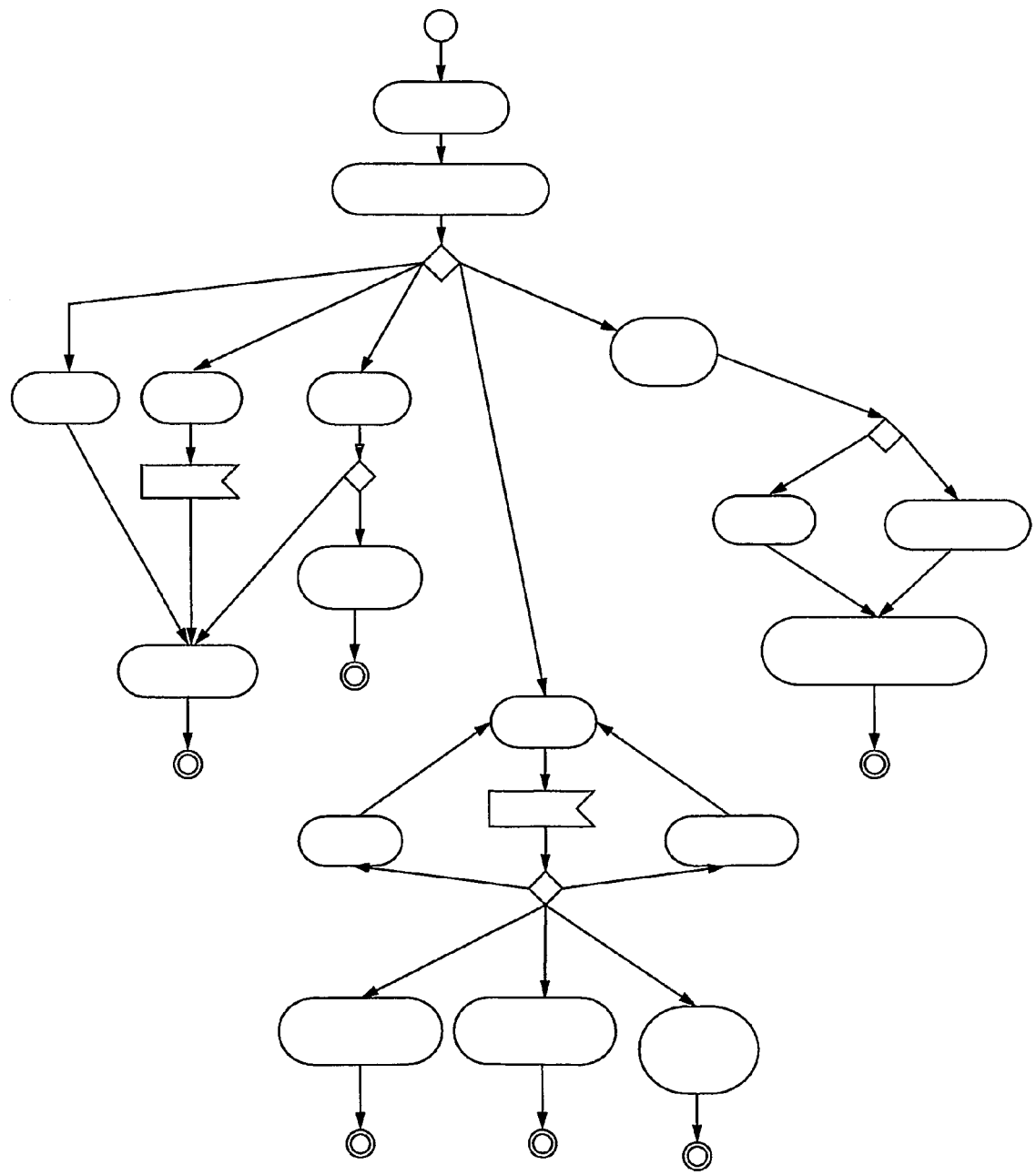
FIG. 9 illustrates a browsing and data processing flow implemented by a terminal used in the electronic financial transaction system of FIG. 1.

Once TML parsing is completed, the terminal 10 switches to the screen specified by the URI in the downloaded TML page. FIG. 9 illustrates the process of browsing the application.

While switching from one screen to another, the terminal 10 updates the values of the variables (using <setvar> elements) associated with the destination screen, if these values are required for generating the text. Then the terminal processes the screen as appropriate for the type of screen.

For display, message and form screens the terminal renders the content on the terminal display. The content can include hyperlinks. The text can be scrolled up and down and hyperlinks selected using the terminal keyboard. For the form screen, when the user points to the form element, the terminal is ready to accept the input specified in the form (keyboard input, magnetic card swiping, pin input, etc.) or to cancel it. The data entered by the user is stored to variables.

While processing the submit screen the terminal constructs a TML document (in the binary format), containing the specified variable values and posts it to the HTTP server via the gateway host. The gateway host URI is also defined on the TML page.

When the screen is processed, the terminal switches to the next screen. For the display screen, this is done by following the link chosen by the user. For the form, message and print screens, the URI specified in <new> element is followed. For the submit screen, the URI specified in <new> or <econn> elements is followed. The HTTP server can also force the microbrowser 12 to switch to some other (static or dynamic) TML screen or page. For the function call screen, the URI specified in <new> or <error> elements is followed.

For any of the screen types, if a <cancel> element is specified for the screen and user presses "Cancel", the microbrowser should switch to the screen identified by the URI specified in <cancel>. When the word "exit" is specified instead of URI, the terminal exits the microbrowser and passes the flow control to the terminal operating system.

If the "menu" key is pressed while processing display screens or forms, the microbrowser switches to the URI specified in the "menu" attribute for that TML page.

The elements <new>, <cancel>, <error> and <econn> allow the URI for the screen which is processed next or to be obtained from the TML variable to be explicitly identified. Moreover, it is possible to specify more than one URI for the above elements. The URI of the next screen is chosen after evaluating the specified logical expressions against TML variables and constants.

A specific example of TML browsing will now be illustrated. Assume that an application comprises the following screens:

a form screen for magnetic card processing with the prompt "SWIPE CARD";

a form for entering the amount of money to be paid with the prompt "ENTER AMOUNT";

a display screen for choosing an online or offline transaction;

two submit screens—one for each of online and offline transactions;

a print screen for printing the receipt; and a message screen for rejected payment authorisations with the message "CALL AUTH CENTER".

First, the microbrowser processes the form screen for a magnetic card. It renders the prompt specified for the form and waits for the card swiping. When the card is swiped, the browser parses the read tracks and assigns values to predefined global variables (such as cardnumber, cardholder, expiry, etc.) and then switches to the form for entering the amount of money. The terminal renders a prompt "ENTER AMOUNT" and waits for terminal keyboard input. The entered amount is saved to the variable with the name specified in the form. The browser then switches to the display screen.

The display screen contains two links with names "online" and "offline". The user can use the microbrowser 12 to navigate the screen. When the user presses "Enter" with a focus at one of the links, the microbrowser follows the link. While processing the submit screen the microbrowser constructs the data that should be posted to the HTTP server (the values assigned on the form screen) and stores it to the terminal memory.

If the submission is online, the HTTP client posts the data immediately. The microbrowser waits for the POST response from the HTTP server before switching pages. The HTTP server can instruct the terminal to switch to the print screen, if authorisation was successful, or to the message screen with the message "CALL AUTH CENTER", if authorisation failed.

If submission is offline, the data remains in the terminal memory until the next session with the gateway host 19. The microbrowser immediately switches to the print screen.

While processing the print screen, the terminal prints the receipt (the print body can contain references to variables—cardnumber, amount, expiry, etc.) and switches to the start screen—the form "SWIPE CARD"—to serve another client.

The methods of updating the TML application will now be described.

Every time the terminal interacts with the gateway host, the gateway host sends conditional HTTP GET requests for every cacheable TML page stored in the terminal permanent memory to the terminal.

The terminal HTTP client replies to the GET request with the corresponding ETag (i.e identifier of cacheable content) HTTP header generated by the gateway host's HTTP proxy. The gateway executable application evaluates ETags and if they match, no content is returned to the terminal. Otherwise, the TML page is reloaded and reparsed.

Figure 10:
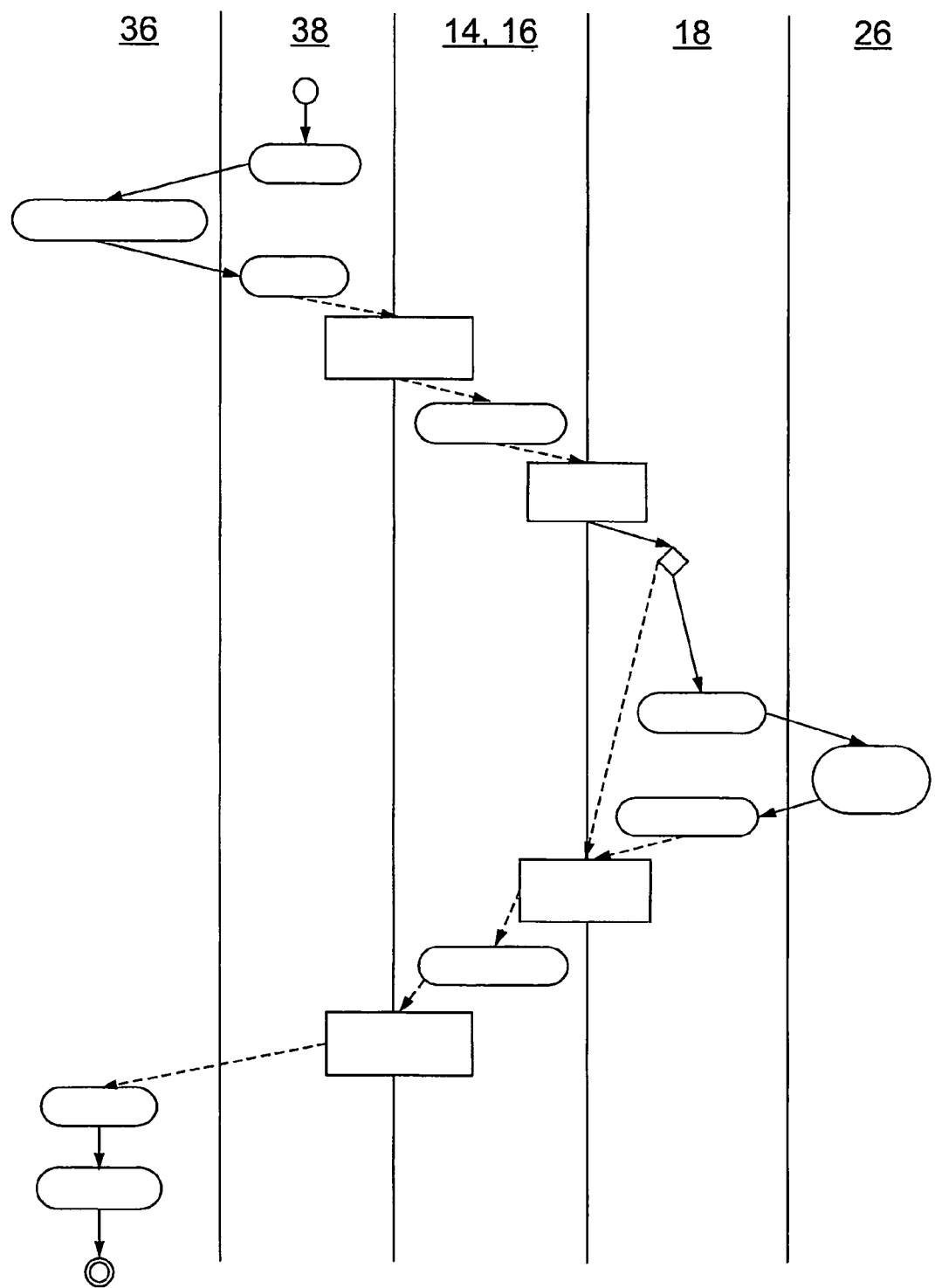
FIG. 10 illustrates a process of terminal autoconfiguration.

FIG. 10 shows the operation of a terminal auto configuration process. A terminal auto configuration may take place every time that the terminal 10 connects to the gateway host 19.

The data submitted by the terminal as well as the replies of the configuration service 26 are cached by the HTTP proxy 18.

Auto configuration utilises RPC calls. The terminal HTTP client 38 asks the terminal configuration module 36 to construct the binary request and wraps it into an STP packet which is sent to the gateway host 19.

The convertor 16 then translates the binary HTTP request to text form and forwards it to the HTTP proxy 18. The HTTP proxy 18 can either retrieve the response from cache 206 or forward the request further to the web service host 26 for processing.

The converter 16 then translates the response to binary form and sends it to the terminal HTTP client 38 which returns the response to the configuration module 36, which in turn parses the reply to configure the terminal 10.

An example of the terminal auto configuration will now be discussed.

Assume that the terminal needs to update the floor limits and the time. Every time the HTTP client 38 establishes a session with the gateway host 19, it constructs an STP packet which wraps several requests. For example, four POST requests with offline submissions; one POST request with online submission; and two conditional GET requests for a TML application and a style sheet. Then, the HTTP client asks the configuration module to construct two HTTP POST requests with remote procedure calls: one RPC for obtaining the floor limits and another for obtaining the time.

The STP packet with the wrapped requests is sent to the gateway host 19 for processing. Both HTTP POST requests and responses with RPC can be cached, so the HTTP proxy 18 is able to respond without asking the HTTP server 20,24. But if the required response is missing in cache, the text HTTP request is sent to the HTTP server 24 running the configuration web service 26. The service 26 processes the remote procedure call retrieving the required data from the database. In this case, the RPC for obtaining the time is not cacheable (and this is specified in the HTTP request), so one of the requests is always sent to the HTTP server 24.

When the terminal HTTP client 38 processes the response STP packet and encounters the POST response with RPC (it is located after conditional GET responses), it requests the configuration module 36 to process it. The configuration module 36 processes the response and updates the terminal 10 settings.

More detail about the security aspects of the system will now be described.

Security threats that may be faced by the system include the use of a fake terminal or fake gateway host, the interception of transmitted data, forgery of security certificates, physical connection of a hostile hardware device to access sensitive information streams, switched networks data packet switching, or smart card or terminal theft. The following describes how the potential risk posed by these and other threats is reduced to an acceptable level.

On a logical level, the system's security mechanism is suitably based on a public key infrastructure (PKI) and control questions security model widely used in financial systems. PKI assumes that the server is authenticated to the client using a digital certificate signed with a so-called root certificate. In the system's security scheme, the client, in turn, is authenticated by the server by answering control questions asked by the server. Only a valid client can answer the questions correctly. A fake client is unaware about previous agreements between a real client and the server so it is likely to fail to give the correct answers.

The data processed by the PKI-based applications is encrypted by a pair of asymmetric keys. The certificates contain public keys which are issued and terminated by a special service called the Certification Authority.

The first task to be completed in implementing the security architecture is to set up the terminal security environment. Before initialisation, the terminal has neither the terminal password nor the root certificates. These are to be loaded during the terminal initialisation.

There are two possible modes of terminal initialisation—a closed envelope mode with a secret initialisation key printed inside, or a smartcard mode. A new terminal is always accompanied with either the closed envelope or the initialisation smartcard.

Figure 11:
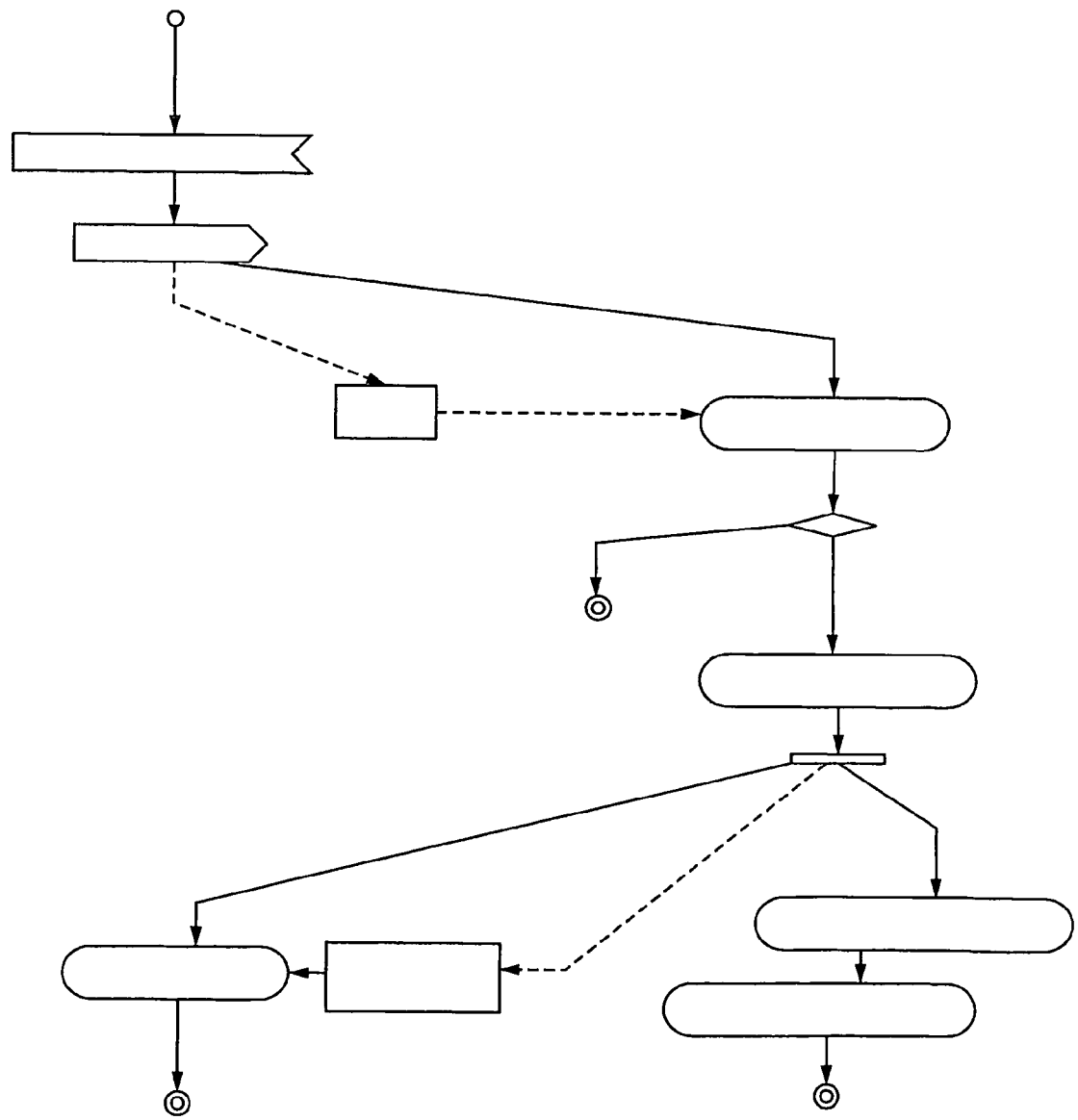
FIG. 11 illustrates a first mode of terminal initialisation.

The closed envelope initialisation mode is illustrated in FIG. 11. The user enters the ITID and the initial key (also referred to as a PIN code) obtained from the envelope. The terminal 10 then opens an SSL session with the target gateway host 19 specified in the terminal configuration and sends the ITID. During the SSL handshake, the terminal 10 does not validate the gateway host's 19 certificate. The gateway host 19 receives the data, extracts the ITID and then searches the terminal information database (particularly in the uninitialised terminals table) for the copy of the terminal initialisation key. The ITID is used to perform the search. If no matching terminal record is found, the gateway host 19 closes the connection. Otherwise, the gateway host issues a random unique password for the requesting terminal.

The unique password and root certificate are then sent to the terminal 10. The terminal 10 stores the received credentials to the terminal memory for future use. Then the terminal deletes the previously entered security data.

When the gateway host 19 receives a confirmation from the terminal 10, it also deletes the outdated terminal record from the terminal information database. The gateway host 19 creates a new terminal record and associates it with the same gateway host 19 which the terminal asked for initialisation. A new record includes the ITID, an 'in-service' flag to indicate that the terminal is active, and a unique terminal password.

The smartcard initialisation mode only requires the terminal operator to insert the smartcard into a terminal and let it complete the initialisation process automatically. Smartcard initialisation can be either automatic or semi-automatic. Automatic initialisation requires the smartcard to store the root certificate along with the unique password and ITID. The terminal is thus initialised instantly in offline mode and connecting to the gateway host is not required. Semi-automatic initialisation assumes that only the initialisation key and ITID should be stored to the card. The terminal 10 must connect to the gateway host 19 to receive the certificate and unique password.

Terminal reinitialisation is only carried out if the terminal or its credentials are stolen, or if the terminal breaks down. In both cases, the terminal must be reinitialised with the same ITID but with a different PIN code. A new closed envelope or smart card should be provided.

After the initialisation, the terminal 10 is ready to accept electronic payments. To initiate a payment, the micro-browser 12 calls the SSL terminal library to establish a secured channel to the data exchange port 62 of the gateway host 19.

After the handshake, the terminal and the gateway host 19 are connected over a secure channel and any request from the terminal is assumed to be safe. But to prevent terminal 10 forgery, the STP protocol provides an additional terminal authentication check. The gateway host 19 searches the terminal information database to check if the 'in-service' flag is set for the requesting terminal 10. If not, the terminal is blocked and the gateway host 19 terminates the session and disconnects. If the terminal is in service, the gateway host retrieves the terminal password and runs a special code which executes the ARCFour encryption algorithm in the loop for a few times. Every loop of the ARCFour encryption consists of definite number of passes. The exact number is randomly chosen but preferably should not be less then 256. The resulting bytes represent the control answers. Then the gateway host requests the terminal 10 to run exactly the same procedure and return the resulting bytes. If both server and terminal sides have processed the same unique passwords, the resulting bytes match and the terminal is considered authenticated.

From this moment, the gateway host 19 trusts the terminal 10 and starts processing the requests coming from it.

Validating the certificates in the handshake phase is the most important task during the terminal authentication. The terminal 10 receives the gateway host 19 certificate and checks it by validating the CA chain.

In an embodiment of the system, the certificates can be generated and signed with publicly available free command-line utilities. If required, the users can sign the root certificate by a well-know certification authority.

Switching a terminal to another gateway host (terminal migration) is also easy and safe, and does not compromise the system's security infrastructure. To achieve this, only a single global terminal information database server is used.

Figure 12:
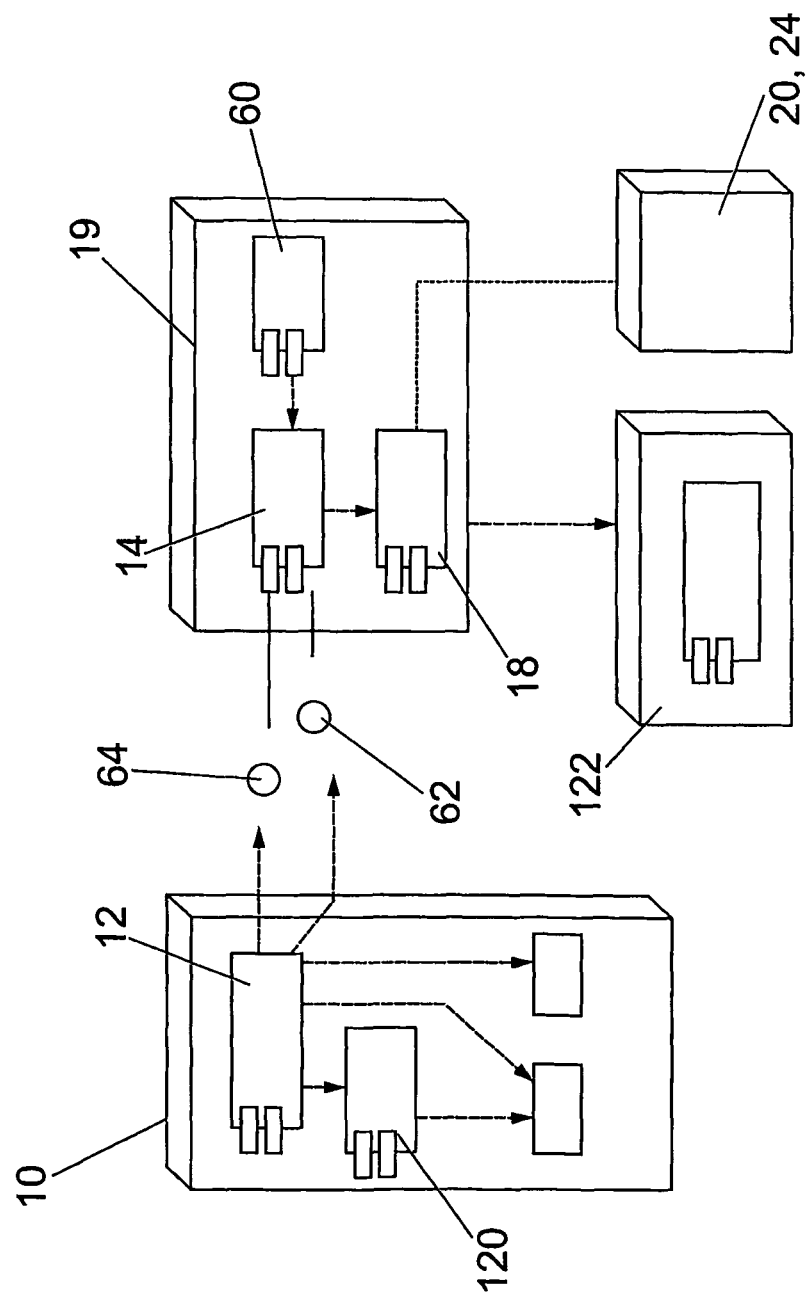
FIG. 12 illustrates a security infrastructure applicable to the electronic financial transaction system of FIG. 1.

FIG. 12 illustrates an example security infrastructure. The internal terminal library 120 supports a client part of the SSL/TLS protocol. It is assumed that all the servers can be deployed at any place; the user owns an arbitrary number of terminals, and that gateway host 19 servers and terminal information database servers 122 are connected in an arbitrary way. In such a scheme, some of the network-wide security repositories can be distributed over different network segments. Note, that the security architecture allows the gateway host 19 and the terminal information database servers 122 to be hosted on the same computer. This deployment scheme is suitable for users who have a single gateway host 19 node and want to minimise the number of hardware units required at the server side. The positive effect of hosting two servers under the single roof is that the deployment scheme has one less physical connection. It is also to be noted that the gateway host 19 and the terminal information database servers 122 use a web GUI for remote security administration.

In addition to the logical security guidelines, the system can be physically protected, for example, by avoiding using conventional packet switching hardware to lower the risk of packet sniffing; securing the wires connecting the servers (i.e. using dedicated fibre optical lines and locked network racks); blocking access to the networking infrastructure for anybody except system administrators; and informing the system administrator immediately about any suspicious terminal behaviour or the terminal or secure keys theft.

The person skilled in the art will now recognise that the abovedescribed embodiments and modifications thereto provide many advantages over known electronic financial transaction systems.

A merchant or other terminal user requires their payment systems to function in a reliable, safe, convenient and efficient manner. To these users, the way the new system processes transactions may have the same look and feel as known payment systems, while being capable of being modified in a way that is more responsive to user needs.

Terminal users who are endowed with administrative rights may be allowed to perform advanced actions with the terminals, for example, gaining a passworded access to a configuration menu. This increases the flexibility of the system.

A system integrator who owns a TML application or applications and the hardware where the system's software is running, is responsible for terminal deployment and configuration, and help desk software support. The system integrators only need to have a working knowledge of TML, rather than having to be proficient in complex programming skills, such as being able to program in C.

A TML application developer can either be employed by the system integrator company or some other third-party company (for example, the terminal manufacturer). The system described above provides them with a powerful programming library with a convenient API. They can also use the terminal simulator to test and debug the terminal application.

Various modifications and improvements can be made to the embodiments described above without departing from the scope of the present invention.

The invention claimed is:
1. A method comprising:
executing, by an electronic payment transaction system comprising a secure terminal and a remote host system, an electronic financial transaction from said secure terminal such that the remote host system communicates securely with the secure terminal and with an acquirer system when processing the transaction;
executing, by the secure terminal, a terminal micro-browser application;
communicating, by the secure terminal executed terminal micro-browser application, securely with the remote host system via a telecommunications network;
downloading, by the secure terminal executed terminal micro-browser application, terminal mark-up language (TML) documents from the remote host system, said downloaded TML documents defining functions defining, within said remote host system, a business logic required to complete a transaction;
storing, by the secure terminal executed terminal micro-browser application, said downloaded TML documents on the secure terminal;
executing, by the secure terminal executed terminal micro-browser application, said stored TML documents;

interpreting, by the secure terminal executed terminal micro-browser application, the business logic defined by said executed TML documents;

reading, by the secure terminal executed terminal micro-browser application, information from a customer's transaction card;

interpreting, by the secure terminal executed terminal micro-browser application, data read from said customer's transaction card using an HTTP client and a card parser;

wherein the card parser is a component of said secure terminal micro-browser application:

receiving, by the secure terminal executed terminal micro-browser application, by the secure terminal user input relating to transactions; and displaying, by the secure terminal executed terminal micro-browser application, information to the user on the secure terminal.

2. The method of claim 1, wherein executing the stored TML documents supports variables in the TML documents.

3. The method of claim 2, wherein executing the stored TML documents supports string, integer, date and opaque variables in the TML documents.

4. The method of claim 2, wherein said stored TML documents comprise XML-based language documents.

5. The method of claim 1, further comprising authenticating the secure terminal and remote host to each other.

6. The method of claim 5, wherein said authentication uses a public key infrastructure (PKI).

7. The method of claim 5, wherein the secure terminal authenticates the remote host system by receiving a digital certificate signed with a root certificate from the remote host system, and wherein the remote host system authenticates the secure terminal by receiving correct answers to control questions from the secure terminal.

8. The method of claim 7, wherein the digital certificate is an X.509 certificate.

9. The method of claim 1, wherein said stored TML documents include a code object defining a form screen which receives user input by any of:
swiping a magnetic card, inserting an ICC card, using a PIN pad keyboard, or using a terminal keyboard.

10. The method of claim 1, wherein said stored TML documents include code objects supporting screen types including a display screen, a print screen, a screen for displaying error or notification messages, and a screen for sending function calls and wherein said executing step executes said code objects.

11. The method of claim 1, wherein the method further comprises the secure terminal checking and initiating the secure terminal's configuration every time the secure terminal connects to the remote host system.

12. The method of claim 1, wherein the step of communicating with the remote host system comprises:
communicating with the remote host system through a gateway host comprising a TCP/IP listener, a processor, a converter and an HTTP proxy.

13. The method of claim 12, wherein communicating comprises communicating between the secure terminal and the gateway host using a protocol stack, said protocol stack comprising a secure transmission protocol layer, a TCP/IP layer, and a binary HTTP (BHTTP) layer.

14. The method of claim 13, wherein the secure transmission protocol layer comprises SSL or TLS.

15. The method of claim 12, wherein the HTTP proxy of the gateway host serves a first HTTP server of the application host arranged to operate with a payment application and a second HTTP server of the web services host arranged to operate with a configuration web service.

16. The method of claim 15, further comprising:
transmitting from the terminal HTTP client requests to download TML documents to the gateway host as binary HTTP requests;
converting by the gateway host the requests to text HTTP requests; and
transmitting by the gateway host HTTP proxy the converted requests to the first or second HTTP server as text HTTP requests.

17. The method of claim 16, further comprising:
transmitting by the first or second HTTP server responses to the requests by the secure terminal to download TML documents to the gateway host HTTP proxy as text HTTP requests; and
converting by the gateway host the responses to binary HTTP requests and transmitting the responses, as binary HTTP requests, to the terminal HTTP client.

18. The method of claim 13, wherein the method further comprises:
providing a TML application host on the remote host system, which communicates with the gateway host and with the acquirer system, and
running a web services host, which communicates with the gateway host.

* * * * *